United States Patent
Birdsall et al.

(10) Patent No.: US 9,424,310 B2
(45) Date of Patent: *Aug. 23, 2016

(54) SYSTEM AND METHOD FOR EXECUTING QUERIES

(71) Applicant: Hewlett-Packard Development Company, L.P., Houston, TX (US)

(72) Inventors: David W. Birdsall, Santa Clara, CA (US); Yung-Li L. Jow, San Carlos, CA (US); Goetz Graefe, Madison, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/215,949

(22) Filed: Mar. 17, 2014

(65) Prior Publication Data
US 2014/0201189 A1  Jul. 17, 2014

Related U.S. Application Data

(63) Continuation of application No. 13/447,737, filed on Apr. 16, 2012, now Pat. No. 8,775,414.

(51) Int. Cl.
*G06F 17/30* (2006.01)

(52) U.S. Cl.
CPC .... *G06F 17/30463* (2013.01); *G06F 17/30466* (2013.01)

(58) Field of Classification Search
None
See application file for complete search history.

(56) References Cited

U.S. PATENT DOCUMENTS

| | | | |
|---|---|---|---|
| 4,956,774 A | 9/1990 | Shibamiya et al. | |
| 4,961,139 A | 10/1990 | Hong et al. | |
| 5,043,872 A | 8/1991 | Cheng et al. | |
| 5,495,608 A | 2/1996 | Antoshenkov | |
| 5,664,172 A * | 9/1997 | Antoshenkov | G06F 17/30433 707/700 |
| 5,778,354 A | 7/1998 | Leslie et al. | |
| 6,021,405 A * | 2/2000 | Celis | G06F 17/30463 |
| 6,353,820 B1 | 3/2002 | Edwards et al. | |
| 6,439,783 B1 | 8/2002 | Antoshenkov | |
| 6,581,055 B1 * | 6/2003 | Ziauddin | G06F 17/30463 |
| 6,931,389 B1 * | 8/2005 | Bleizeffer | G06F 17/30306 |
| 7,330,848 B2 | 2/2008 | Chaudhuri et al. | |
| 8,255,382 B2 * | 8/2012 | Carpenter | G06F 17/3064 707/707 |
| 8,903,805 B2 * | 12/2014 | Lee | 707/718 |
| 2004/0236762 A1 | 11/2004 | Chaudhuri et al. | |

(Continued)

OTHER PUBLICATIONS

Borovica-Gajic, R. et al., "Smooth Scan: Statistics-Oblivious Access Paths," Data Engineering (ICDE), IEEE 31st International Conference, Apr. 13, 2015, 12 pages, available at http://scholar.harvard.edu/files/stratos/files/smoothscanicde15.pdf.

*Primary Examiner* — Hung Le
(74) *Attorney, Agent, or Firm* — International IP Law Group, PLLC

(57) ABSTRACT

There is provided a computer-implemented method of executing a query plan against a database. An exemplary method comprises accessing a first subset of rows of a database table using a direct access method for an index. The query plan may comprise the direct access method. The exemplary method also comprises determining a processing cost of accessing the first subset of rows. The exemplary method further comprises modifying the direct access method for the index in response to determining that the processing cost exceeds a specified threshold. Additionally, the exemplary method comprises accessing a second subset of rows of the database table using the modified direct access method.

20 Claims, 5 Drawing Sheets

(56) References Cited

U.S. PATENT DOCUMENTS

| | | | |
|---|---|---|---|
| 2006/0074635 A1 | 4/2006 | Gilbert et al. | |
| 2006/0074874 A1* | 4/2006 | Day et al. | 707/3 |
| 2008/0091642 A1 | 4/2008 | Bestgen et al. | |
| 2008/0183684 A1 | 7/2008 | Bestgen et al. | |
| 2010/0257153 A1* | 10/2010 | Day | G06F 17/30442 707/715 |
| 2011/0029508 A1* | 2/2011 | Al-Omari | G06F 17/30433 707/718 |
| 2011/0041171 A1* | 2/2011 | Burch | H04L 63/08 726/7 |
| 2011/0047144 A1 | 2/2011 | Han et al. | |
| 2011/0055134 A1* | 3/2011 | Dvorak | G06F 11/2294 706/47 |
| 2011/0093500 A1 | 4/2011 | Meyer et al. | |
| 2011/0258179 A1* | 10/2011 | Weissman | G06F 17/30389 707/714 |
| 2012/0047158 A1* | 2/2012 | Lee | G06F 17/30469 707/759 |
| 2012/0131326 A1* | 5/2012 | Lau | H04L 63/104 713/150 |
| 2013/0091115 A1* | 4/2013 | Brake | G06F 17/30864 707/708 |
| 2013/0151314 A1* | 6/2013 | Kugler | G06Q 30/0201 705/7.32 |
| 2013/0151491 A1* | 6/2013 | Gislason | 707/696 |
| 2014/0280494 A1* | 9/2014 | Samoylenko | G06F 9/541 709/203 |
| 2015/0334207 A1* | 11/2015 | Kane | H04L 67/1097 709/203 |

* cited by examiner

SYSTEM AND METHOD FOR EXECUTING QUERIES

CROSS REFERENCE TO RELATED APPLICATION

This application claims the benefit of U.S. application Ser. No. 12/603,939 titled "System and Method for Executing Queries," filed Oct. 22, 2009, and U.S. application Ser. No. 13/447,737 titled "System and Method for Executing Queries," filed Apr. 16, 2012, which are incorporated by reference herein.

BACKGROUND

In a database management system (DBMS), an optimizer generates a query plan that is used at execution time to perform the accesses and modifications of a particular query. For any one database table referenced in the query, the optimizer may decide on a specific number of columns to use in the table's index for direct access to the table. The decision may be based on estimated cardinalities for distinct values in the table for each column of the index.

At times, the estimated cardinalities may be inaccurate. As a result, the accesses to the table at execution time may be suboptimal. For example, if too few columns are used, the query plan may lead to excessive scanning. On the other hand, if too many columns are used, the query plan may incur greater processing costs using direct access than may have been incurred using sequential access.

BRIEF DESCRIPTION OF THE DRAWINGS

Certain exemplary embodiments are described in the following detailed description and in reference to the drawings, in which.

DETAILED DESCRIPTION

Figure 1A:
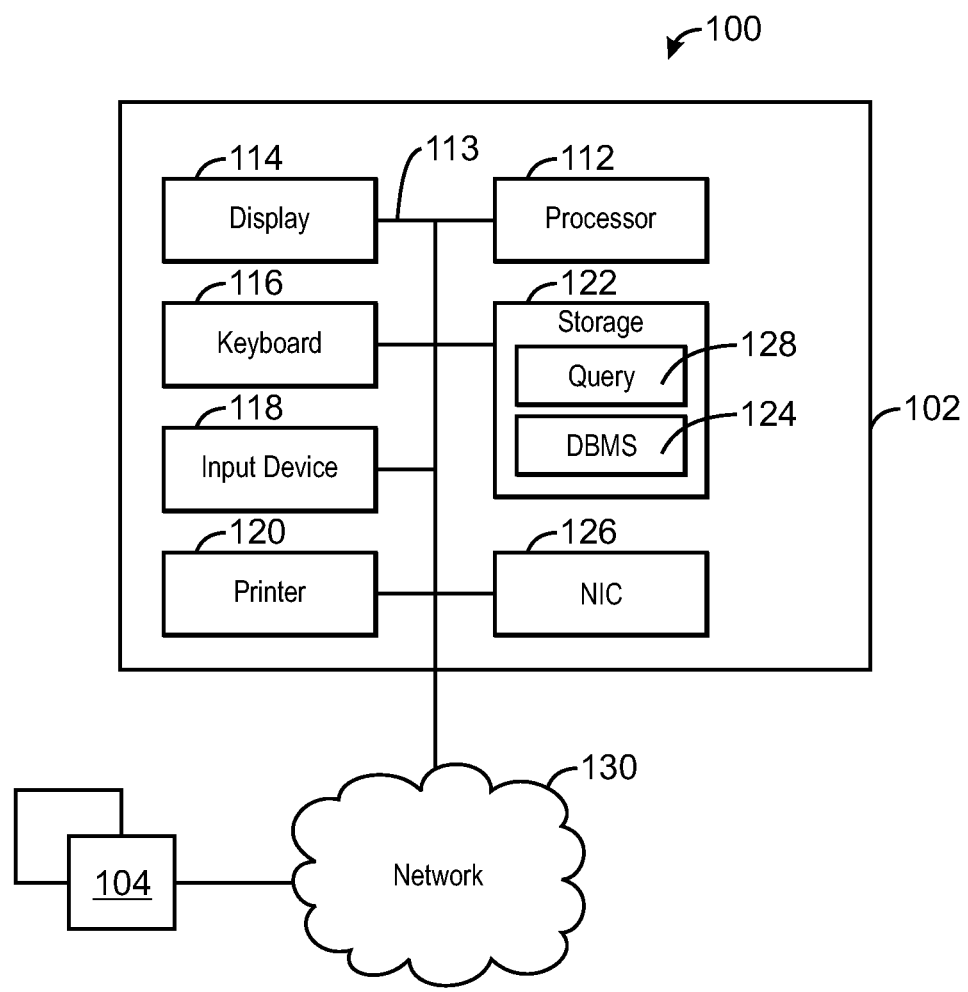
FIG. 1A is a block diagram of a system adapted to execute a query plan according to an exemplary embodiment of the present invention.

FIG. 1A is a block diagram of a system adapted to optimize a query on a database management system according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include a processor 112 which may be connected through a bus 113 to a display 114, a keyboard 116, one or more input devices 118, and an output device, such as a printer 120. The input devices 118 may include devices such as a mouse or touch screen.

The database server 102 may also be connected through the bus 113 to a network interface card (NIC) 126. The NIC 126 may connect the database server 102 to the network 130. The network 130 may be a local area network (LAN), a wide area network (WAN), or another network configuration. The network 130 may include routers, switches, modems, or any other kind of interface device used for interconnection.

Through the network 130, several client computers 104 may connect to the database server 102. The client computers 104 may be similarly structured as the database server 102, with exception to the storage of the DBMS 124. In an exemplary embodiment, the client computers 104 may be used to submit the query 128 to the database server 102 for execution by the DBMS 124.

The database server 102 may have other units operatively coupled to the processor 112 through the bus 113. These units may include tangible, machine-readable storage media, such as a storage 122. The storage 122 may include media for the long-term storage of operating software and data, such as hard drives. The storage 122 may also include other types of tangible, machine-readable media, such as read-only memory (ROM), random access memory (RAM), and cache memory. The storage 122 may include the software used in exemplary embodiments of the present techniques.

The storage 122 may include a database management system (DBMS) 124 and a query 128. The DBMS 124 may be a set of computer programs that controls the creation, maintenance, and use of databases by an organization and its end users. The DBMS 124 is described in greater detail with reference to FIG. 1B.

The query 128 may be a relational query language statement for accessing or updating data stored in the DBMS 124. Relational query languages may include any query language configured to access and update data stored in a relational database. In an exemplary embodiment, the relational query language statements may be Structured Query Language (SQL) statements.

Figure 1B:
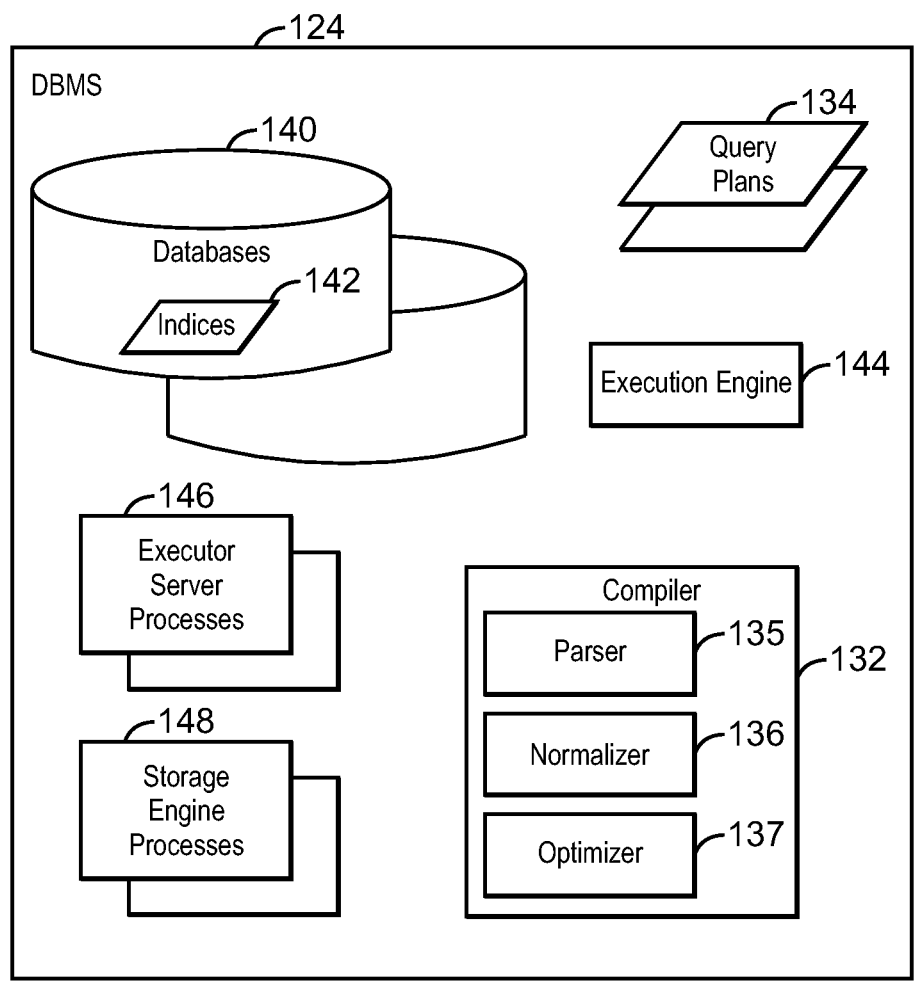
FIG. 1B is a block diagram of a database management system adapted to execute a query plan according to an exemplary embodiment of the present invention.

FIG. 1B is a block diagram of the DBMS 124 adapted to execute a query plan 134 for the query 128 according to an exemplary embodiment of the present invention. As illustrated, the DBMS 124 may include a compiler 132, the query plans 134, and several databases 140 against which the query plans 134 may be executed. The databases 140 may include user data organized into tables, rows and columns, typical of a relational DBMS.

The databases 140 may include indices 142 for the tables of the databases 140. An index 142 may identify one or more rows in a particular table based on an index key. Identifying the one or more rows may enable direct access to the one or more rows. The index key may include one or more columns for the table.

The compiler 132 may be software that generates the query plans 134, which are implemented at runtime by the execution engine 144. The compiler 132 may consist of several modules, including, but not limited to, a parser 135, a normalizer 136, and an optimizer 137. Each of the modules may perform a separate phase of query plan generation.

In one phase, the parser 135 may perform syntax checking on the query 128. The parser 135 may also build a query tree, which may be an algebraic tree representation of the query 128. In another phase, a normalizer 136 may transform the query tree into a form for optimization, such as a canonical tree form.

In yet another phase, the optimizer 137 may generate several potential query plans 134 to determine the execution strategy for the query 128. The potential query plans 134 may be based on the query tree in the canonical tree form. The potential query plan 134 with the minimal processing cost may be selected for the execution strategy.

In an exemplary embodiment of the invention, the query plan 134 may specify access to the database tables in a two-step process. The two steps may include direct access and sequential access.

The direct access method may, through the use of the index 142, directly access one or more rows in a database table. For example, a database table labeled Employees may include information such as name, address, social security number (SSN) or the like. Because the SSN is unique for each employee, the index 142 may include the SSN to uniquely identify rows in the Employees table. As such, the query plan 134 may directly access the row for any particular employee by using the SSN for the employee.

Where the query 128 only accesses one row of a table, direct access alone may be sufficient to create the result for the query. However, when the query 128 is configured to access multiple rows, sequential access may be used in concert with direct access.

For example, the database 124 may also include a database table labeled Evaluations, where each row may include information about each employee's yearly performance evaluation. The Evaluations table may include information such as the period of time evaluated, date of the evaluation, comments from a supervisor, comments from the employee or the like. The Evaluations table may also include information that uniquely identifies the Employee, such as the SSN.

The query 128 may be configured to retrieve all Evaluations for the past 3 years for a particular employee. Accordingly, the query plan 134 may directly access the first row in the Evaluations table for a particular employee by using the SSN. The sequential access step may then scan the rows of the Evaluations table with the same SSN to access data from the previous 3 years' evaluations. In an exemplary embodiment, a selection predicate may be used that select the rows with the appropriate evaluation dates.

While this example only uses one index column for direct access, as stated previously, the index 142 may include numerous columns. As such, the query plan 134 may specify more than one column in the direct access step.

In an exemplary embodiment of the invention, the optimizer 137 may generate multiple alternatives for the direct access portion of the query plan 134. Each alternative may reflect a different choice of the number of columns for direct access using the index 142. Given an n-column index key, up to n+1 choices may be included. The optimizer 137 may select from amongst the possible number of index columns based on estimated cardinalities for distinct values in the index columns.

The optimizer 137 may specify disjuncts on a chosen number of columns for direct access using a particular index 142. The query plan 134 may also include one or more selection predicates. The selection predicates may embody the semantics of predicates on any remaining columns for the query 128 that are not included in the chosen number of index columns. Depending on the query 128, the remaining columns may include key columns, non-key columns, or both.

The execution engine 144 may include server processes 146 and storage engine processes 148. Operators in the query plan 134 may be delegated to one or more of the server processes 146, each of which may execute a subset of the query plan 134 on some partition of data.

The storage engine processes 148 may executes those parts of the query plan 134 that perform input-output functionality (I/O) on the databases 140. The storage engine processes 148 may also contain lock management and auditing functionality. In an exemplary embodiment of the invention, the storage engine processes 148 may maintain a balanced-tree (B-tree) representation of one or more indices 142. The B-tree may include one or more index blocks representing the number of columns in the index 142.

Figure 2:
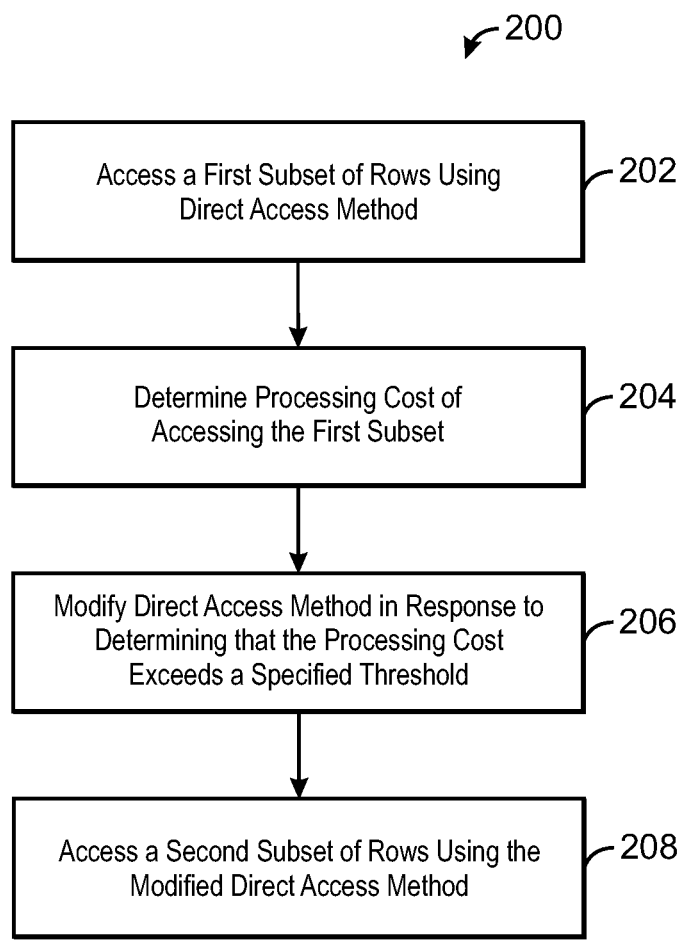
FIG. 2 is a process flow diagram showing a computer-implemented method for executing a query plan according to an exemplary embodiment of the present invention.

FIG. 2 is a process flow diagram showing a computer-implemented method for optimizing the query 128 according to an exemplary embodiment of the present invention. The method is generally referred to by the reference number 200, and may be performed by the execution engine 144. It should be understood that the process flow diagram is not intended to indicate a particular order of execution.

The method may begin at block 202. At block 202, the execution engine 144 may access a first subset of rows using a direct access method. The first subset may provide a sample size for which a processing cost may be used to determine the efficiency of the direct access method. The size of the first subset may vary depending on the particular implementation of exemplary embodiments of the invention.

At block 204, the execution engine 144 may determine the processing cost of accessing the first subset. In an exemplary embodiment of the invention, the processing cost may be based on a number of times that the direct access method results in accesses to the same page of data.

Because the direct access method may include multiple steps, accessing the same page repeatedly using direct access may be more costly than sequentially scanning the page. Accordingly, at block 206, the execution engine 144 may modify the direct access method in response to determining that the processing cost exceeds a specified threshold. The specified threshold may represent a ratio of the costs of direct access versus sequential access.

At block 208, the execution engine may access a second subset of rows using the modified direct access method. In an exemplary embodiment of the invention, the direct access method may be modified to use one less column.

In other words, using the Evaluations table example, the optimizer 137 may include both the SSN column and the evaluation date column in the direct access method. If this direct method results in repeated access to the same page of data, the direct access method may be modified to only use the SSN column.

In this manner, instead of repeatedly accessing the same page using SSN and evaluation date, the modified direct access method may access a particular page only once by merely using the SSN. Then, the sequential access method may be used to scan the page, applying a selection predicate for the evaluation date.

Figure 3:
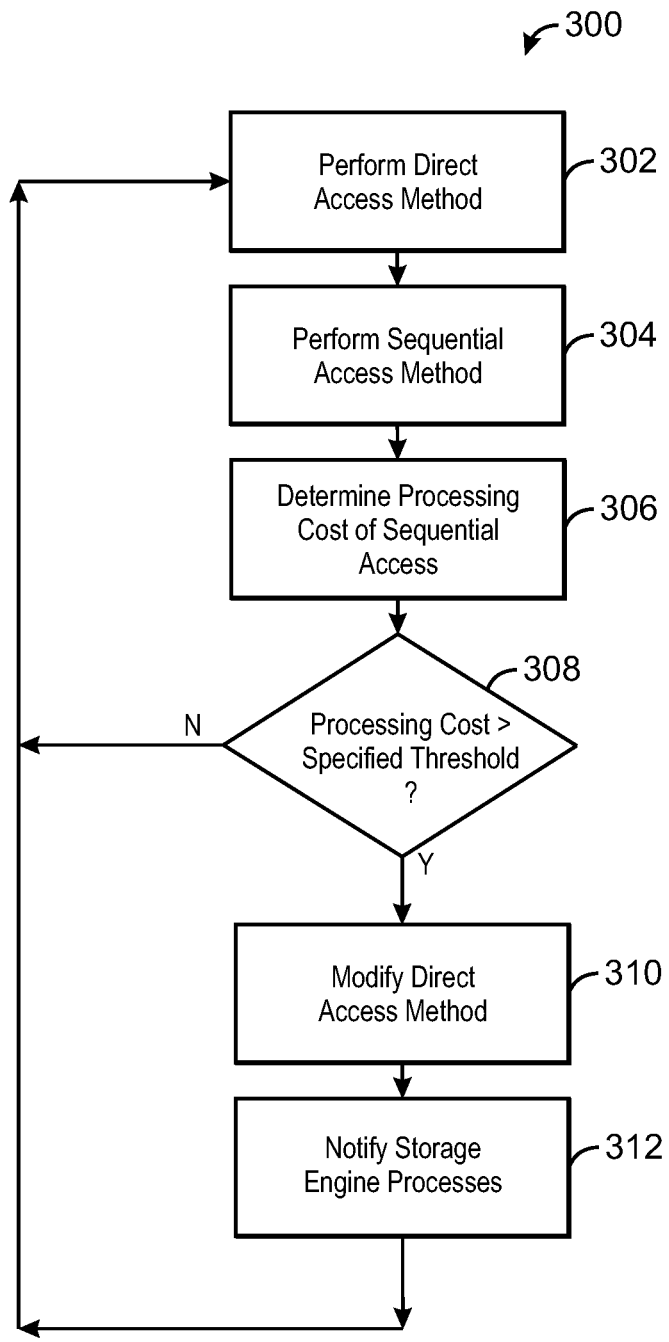
FIG. 3 is a process flow diagram showing a computer-implemented method for executing a query plan according to an exemplary embodiment of the present invention.

FIG. 3 is a process flow diagram showing a computer-implemented method for executing the query plan 134 according to an exemplary embodiment of the present invention. The method is generally referred to by the reference number 300, and may be performed by the execution engine. It should be understood that the process flow diagram is not intended to indicate a particular order of execution.

The method begins at block 302. At block 302, the execution engine 144 may perform the direct access method, described with reference to FIG. 2.

At block 304, the execution engine 144 may perform the sequential access method. The sequential access method may include a sequential scan of rows starting at the row accessed by the direct access method. The sequential access method may also include applying a selection predicate to each row included in the scan.

At block 306, the execution engine 144 may determine the processing cost of the sequential access method. In an exemplary embodiment of the invention, the processing cost may be based on the number of consecutive rows accessed in the sequential access method for which the selection predicate is false.

At block 308, the execution engine 144 may determine whether the processing cost of the sequential access method exceeds a specified threshold. As stated previously, the specified threshold may reflect the ratio in processing costs of direct access versus sequential access.

If the processing cost does not exceed the specified threshold, the method 300 may be repeated using the same direct access method. If the processing cost does exceed the specified threshold, at block 310, the execution engine 144 may modify the direct access method.

If the direct access method leads to an excessive number of unsuccessful consecutive scans, the processing cost of executing the query plan 134 may be reduced by further exploiting direct access. In an exemplary embodiment of the invention, the direct access method may be modified to include an additional column from the index 142.

At block 312, the execution engine 144 may notify the storage engine processes of the modification to the direct access method. The storage engine processes may improve cache replacement policies for the B-tree maintenance based on the modification to the direct access method.

For example, by including an additional column in the direct access method, cache replacement may be improved by keeping lower-level B-tree nodes in the cache. Similarly, if the direct access method is modified to remove a column, the cache replacement may be improved by putting less importance on keeping lower-level B-tree nodes in cache.

Figure 4:
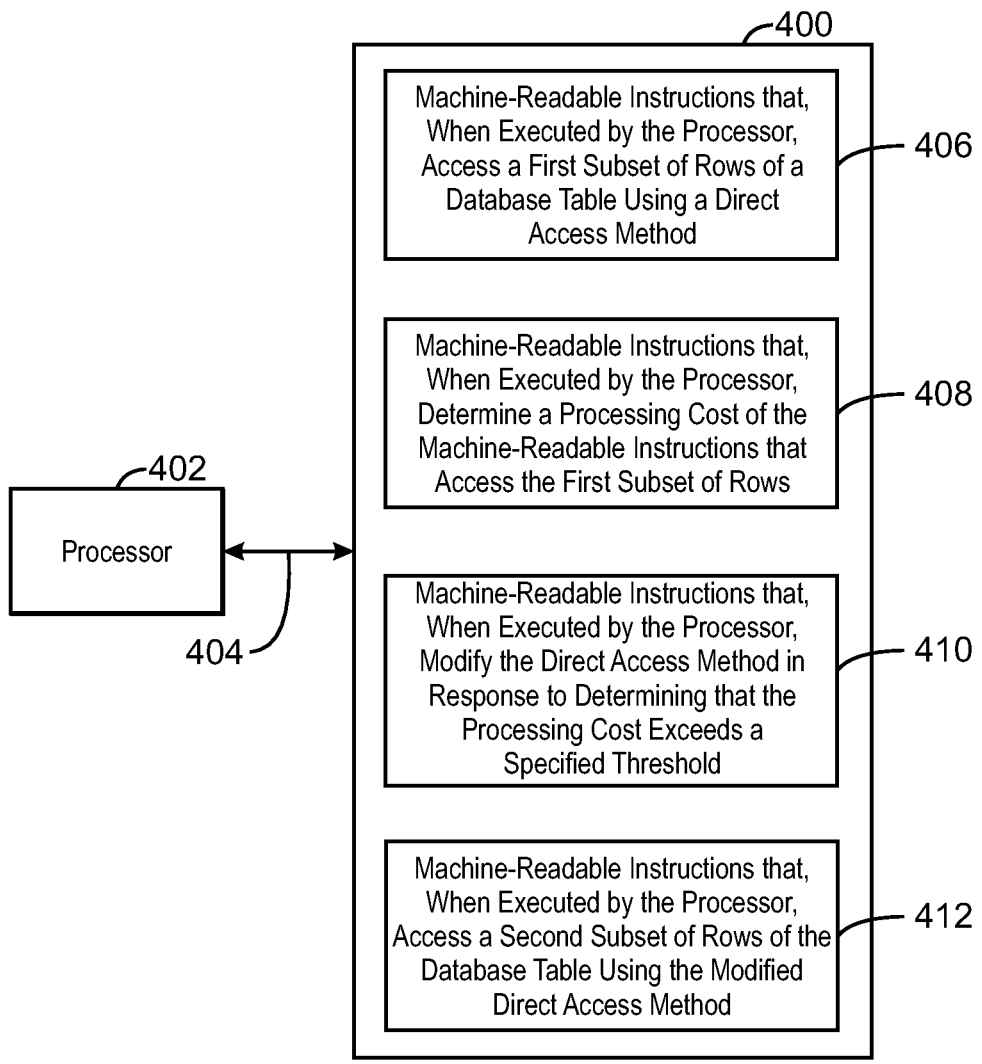
FIG. 4 is a block diagram showing a tangible, machine-readable medium that stores code adapted to optimize a query according to an exemplary embodiment of the present invention.

FIG. 4 is a block diagram showing a tangible, machine-readable medium that stores code adapted to facilitate executing the query plan 134 according to an exemplary embodiment of the present invention. The tangible, machine-readable medium is generally referred to by the reference number 400. The tangible, machine-readable medium 400 may correspond to any typical storage device that stores computer-implemented instructions, such as programming code or the like. Moreover, tangible, machine-readable medium 400 may be included in the storage 122 shown in FIG. 1. When read and executed by a processor 402, the instructions stored on the tangible, machine-readable medium 400 are adapted to cause the processor 402 to execute the query plan 134.

A region 406 of the tangible, machine-readable medium 400 stores machine-readable instructions that, when executed by the processor 402, access a first subset of rows of a database table using a direct access method. A region 408 of the tangible, machine-readable medium 400 stores machine-readable instructions that, when executed by the processor 402, determine a processing cost of the machine-readable instructions that access the first subset of rows.

A region 410 of the tangible, machine-readable medium 400 stores machine-readable instructions that, when executed by the processor 402, modify the direct access method in response to determining that the processing cost exceeds a specified threshold. A region 412 of the tangible, machine-readable medium 400 stores machine-readable instructions that, when executed by the processor 402, access a second subset of rows of the database table using the modified direct access method.

What is claimed is:

1. A computer-implemented method of executing a query plan against a database, comprising:
   accessing a first subset of rows of a database table using a direct access method for an index of the database table, wherein the query plan comprises the direct access method;
   determining a processing cost of accessing the first subset of rows;
   scanning sequentially the first subset of rows using a sequential access method, wherein the scan begins at a row accessed by the direct access method;
   determining a processing cost of the sequential access method, wherein the processing cost is based on a number of consecutive rows accessed in the sequential access method for which a selection predicate is false;
   modifying the direct access method for the index in response to determining that the processing cost of the sequential access method exceeds a specified threshold, wherein the specified threshold comprises a ratio of the processing cost of accessing the first subset of rows to the processing cost of the sequential access method; and
   accessing a second subset of rows of the database table using the modified direct access method.

2. The method recited in claim 1, wherein the direct access method comprises selecting one or more rows of the first subset from a page of data, using an initial number of columns of the index.

3. The method recited in claim 2, wherein the modified direct access method comprises selecting one row of the page using a lesser number of columns than the initial number.

4. The method recited in claim 3, comprising performing the sequential access method in association with performing the modified direct access method to access the first subset of rows at a processing cost less than the processing cost of the direct access method.

5. The method recited in claim 4, wherein the sequential access method comprises scanning the page for the first subset of rows based on the selection predicate for a column of the index.

6. The method recited in claim 1, wherein the index is represented by a balanced tree, wherein the balanced tree comprises index blocks representing a first number of columns of the index, wherein the direct access method uses the first number of columns.

7. The method recited in claim 1, wherein a processing cost of accessing the second subset of rows is less than the processing cost of accessing the first subset of rows.

8. The method recited in claim 1, wherein the second subset of rows comprises the first subset of rows.

9. The method recited in claim 8, wherein the modified direct access method comprises using a different number of columns of the index than a number of columns of the index used by the direct access method.

10. A computer system for executing a query plan against a database, the computer system comprising:
    a processor that executes stored instructions;
    a cache memory comprising a balanced tree representing an index of a database table; and
    a memory device that stores instructions, the memory device comprising:

computer-implemented code to access a first subset of rows of the database table using a direct access method for a first number of columns of the index represented in the balanced tree by scanning one or more rows of the first subset and determining whether a predicate is true for the scanned one or more rows of the first subset;

computer-implemented code to determine a processing cost accessing the first subset of rows, wherein the processing cost comprises a number of consecutive rows in the scanned one or more rows for which a predicate is false;

computer-implemented code to modify the direct access method in response to determining that the processing cost exceeds a specified threshold;

computer-implemented code to access a second subset of rows of the database table using the modified direct access method, wherein the modified direct access method uses a second number of columns of the index represented in the balanced tree; and computer-implemented code adapted to maintain storage of the balanced tree in the cache memory.

11. The computer system recited in claim 10, comprising one or more storage engine processes that improve cache replacement policies for B-tree maintenance based on the modified direct access method.

12. The computer system recited in claim 11, the storage engine processes keeping lower-level B-tree nodes in a cache, and the second number of columns comprising an additional column.

13. The computer system of claim 11, the second number of columns comprising one less column than the first number of columns.

14. A tangible, machine-readable medium that stores machine-readable instructions executable by a processor to execute a query plan against a database, the tangible, machine-readable medium comprising:

machine-readable instructions that, when executed by the processor, access a first subset of rows of a database table using a direct access method for an index of the database table, wherein the query plan comprises the direct access method;

machine-readable instructions that, when executed by the processor, determine a processing cost of accessing the first subset of rows;

machine-readable instructions that, when executed by the processor, modify the direct access method for the index in response to determining that the processing cost exceeds a specified threshold; and machine-readable instructions that, when executed by the processor, access a first subset of rows of the database table by using the modified direct access method and a sequential access method.

15. The tangible, machine-readable medium recited in claim 14, wherein the direct access method comprises machine-readable instructions that, when executed by the processor, access one or more rows of the first subset using a first number of columns of an index of the database table, and wherein the modified direct access method comprises machine-readable instructions that, when executed by the processor, access one or more rows of the second subset using a second number of columns of the index, wherein the first number is not equal to the second number.

16. The tangible, machine-readable medium recited in claim 14, wherein the direct access method comprises machine-readable instructions that, when executed by the processor, access one or more rows of the first subset from a page of data, using an initial number of columns of the index.

17. The tangible, machine-readable medium recited in claim 16, wherein the modified direct access method comprises machine-readable instructions that, when executed by the processor, access one row of the page of data using a lesser number of columns than the initial number.

18. The tangible, machine-readable medium recited in claim 17, wherein the sequential access method comprises machine-readable instructions that, when executed by the processor, scan the page for the first subset of rows based on a selection predicate for a column of the index.

19. The tangible, machine-readable medium recited in claim 14, wherein a processing cost of accessing the second subset of rows is less than the processing cost of accessing the first subset of rows.

20. The tangible, machine-readable medium recited in claim 14, wherein the index is represented by a balanced tree, wherein the balanced tree comprises index blocks representing the first number of columns of the index.

\* \* \* \* \*